United States Patent [19]
Joyce

[11] Patent Number: 5,984,663
[45] Date of Patent: Nov. 16, 1999

[54] GAS FUELED HEATING APPLIANCE

[75] Inventor: John V. Joyce, Bayview, Australia

[73] Assignee: Bowin Technology Pty. Ltd., Brookvale, Australia

[21] Appl. No.: 08/751,742

[22] Filed: Nov. 18, 1996

Related U.S. Application Data

[63] Continuation-in-part of application No. 08/487,178, Jun. 7, 1995, abandoned.

[30] Foreign Application Priority Data

Apr. 19, 1995 [AU] Australia .................................. PN2482
Apr. 19, 1996 [WO] WIPO ........................ PCT/AU96/0029

[51] Int. Cl.⁶ ........................................................ F23N 5/00
[52] U.S. Cl. ................................ 431/76; 431/78; 126/86; 126/92 R
[58] Field of Search ................................ 126/92 B, 92 R, 126/85 R, 86, 39 BA, 91 A; 431/25, 19, 75, 76, 79, 78, 29, 6

[56] References Cited

U.S. PATENT DOCUMENTS

| | | |
|---|---|---|
| 4,296,727 | 10/1981 | Bryan . |
| 4,390,125 | 6/1983 | Rozzi . |
| 4,451,226 | 5/1984 | Landis et al. .............................. 431/69 |
| 4,525,137 | 6/1985 | Tomioka et al. .......................... 126/96 |
| 4,543,056 | 9/1985 | Sakakibara . |
| 4,718,846 | 1/1988 | Oguri et al. . |
| 5,037,291 | 8/1991 | Clark . |
| 5,439,374 | 8/1995 | Jamieson . |
| 5,464,038 | 11/1995 | Kruto . |

FOREIGN PATENT DOCUMENTS

| | | |
|---|---|---|
| 15382/76 | 1/1978 | Australia . |
| 2415269 | 8/1979 | France . |
| 2564571 | 11/1985 | France . |
| 2650057 | 1/1991 | France . |
| 3931095 | 3/1990 | Germany . |
| 2099607 | 12/1982 | United Kingdom . |

*Primary Examiner*—James C. Yeung
*Attorney, Agent, or Firm*—Pearne, Gordon, McCoy & Granger LLP

[57] ABSTRACT

A gas heater is provided with a combustion status sensor that provides heater performance data to a controller that controls the heater according to the sensor data and stored calibration parameters optimized for the particular heater.

24 Claims, 9 Drawing Sheets

GAS FUELED HEATING APPLIANCE

This application is a continuation-in-part of U.S. patent application Ser. No. 08/487,187, filed Jun. 7, 1995, now abandoned.

BACKGROUND OF THE INVENTION

The present invention relates to a gas heating appliance and in particular to an electronically controlled gas heater.

The invention has been developed primarily for use in domestic gas space heaters and will be described hereinafter with reference to this application. However, it will be appreciated that the invention is not limited to this particular field of use.

Gas heaters are popular due to their low costs, both capital and on-going, and their high heating capacity. However, increasing awareness of the dangers of emissions of oxides of nitrogen (NOx), particularly in flueless heaters, has seen a corresponding increase in the amount of regulation surrounding such heaters.

One way to reduce NOx emission from a gas heater has been to optimize the combustion chamber and burner designs, and air injection systems. However, in the past such optimization has generally occurred in the physical size and layout of the chamber, and crude pre-setting of a minimum of a heater's many possible operating parameters.

Another major concern, with flueless gas heaters in particular, is the depletion of oxygen which takes place in a poorly ventilated room. As oxygen ($O_2$) is consumed, carbon dioxide ($CO_2$) builds up and can provide a health risk for the persons in the room.

Flashback is a condition where the flame is inside of the burner rather than on top of the combustion surface. To prevent destruction of the burner under flashback conditions, the typical heater has required a burner that is substantially more rugged, heavy and expensive than otherwise needed.

Also, the ability to change the operating parameters of such a device during manufacture and after installation has been severely limited in scope. Reliance has been placed upon test equipment external to the device or rudimentary electronic controls.

SUMMARY OF THE INVENTION

It is an object of the present invention to overcome or at least ameliorate one or more of these disadvantages.

A heating appliance fueled by a combustible gas includes a gas burner, the gas burner providing a site for substantially all of the combustion; a jet for delivering the gas to the burner; a valve for controlling flow of the gas to the jet; an electrical ignition system for selectively igniting gas at the burner; a combustion chamber about the burner, the chamber having an inlet for combustion air and an outlet for burned gases; a combustion status sensor located at the combustion site for providing a signal indicative of a combustion status to be sensed; and a first controller that controls the appliance in accordance with the combustion status signal and a plurality of stored calibration parameters, the controller thereby being responsive to at least one of CO2/O2 concentration, flashback, combustible gas type, or gas pressure.

Another embodiment of the invention in the form of a heating appliance including a thermocouple located at the combustion site for providing a first signal indicative of a combustion status to be sensed; a temperature sensor located near an outlet for the combined cooling air and burned gases, the temperature sensor providing a second signal indicative of the combustion status to be sensed; and a first controller that controls said appliance in accordance with the sum of the combustion status signals.

Another embodiment of the invention in the form of a heating appliance including a combustion gas temperature sensor located at the combustion site for providing a first signal indicative of a combustion status to be sensed; a combustion gas conductivity sensor located at the combustion site for providing a second signal indicative of a combustion status to be sensed; and a first controller that for an initial period controls the appliance in accordance with the second signal and for a later period controls the appliance in accordance with the first signal, the controller thereby being responsive to flashback during either period.

Another embodiment of the invention in the form of a heating appliance including a combustion sensor and a first controller that provides an alert sequence if the sensor detects an ongoing combustion signal before an ignition attempt or if combustion continues after gas shutoff, the alert sequence including activating said fan for the duration of said alert sequence.

The present invention is primarily concerned with actively monitoring changes in the operation and efficiency of the appliance over time, rather than the macro effects of the heated air created by the appliance. The controller of the invention interprets data change with respect to small time increments to ascertain and vary the status of the appliance.

DESCRIPTION OF THE PREFERRED EMBODIMENTS

Figure 1:
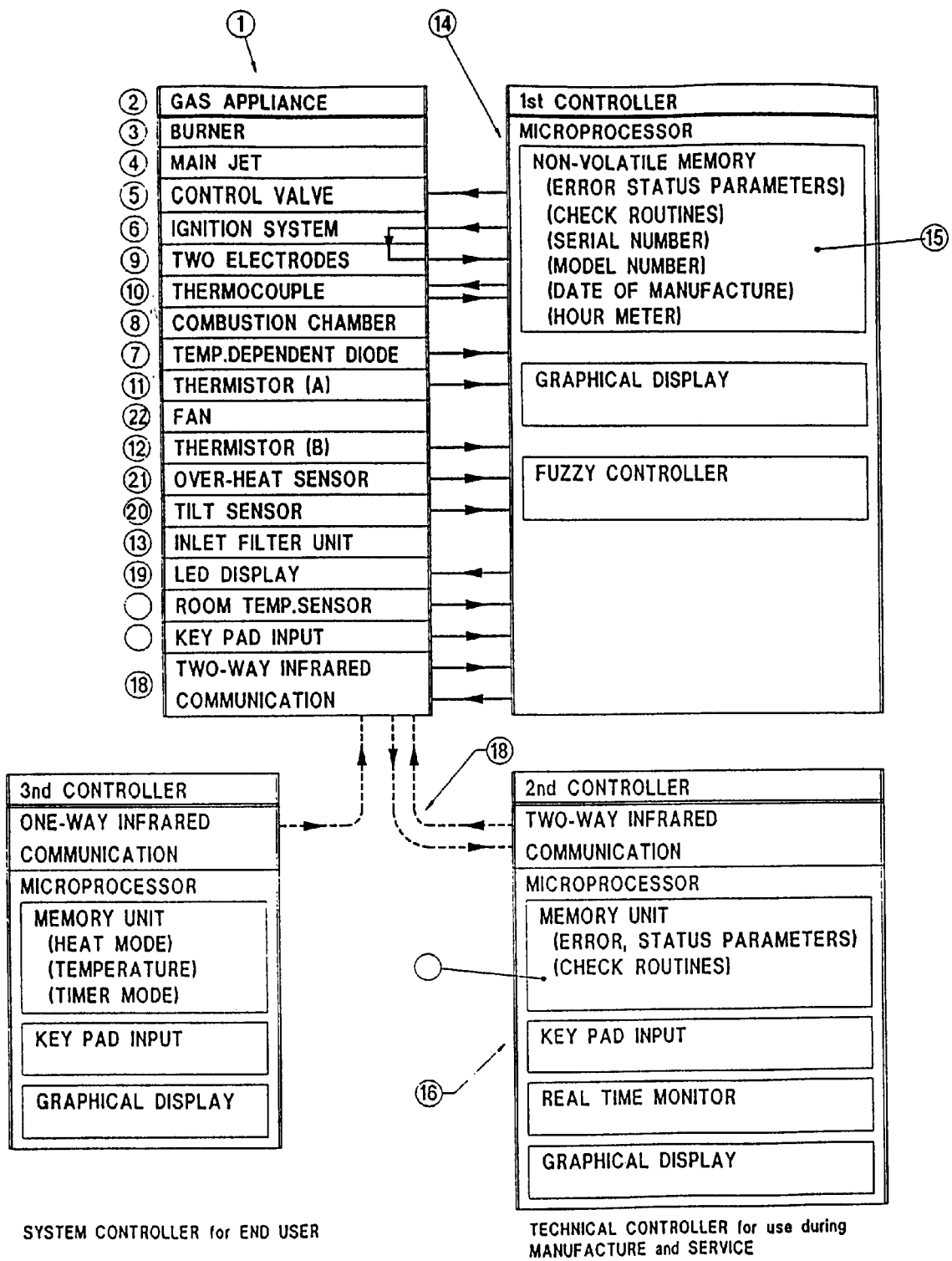
FIG. 1 is a schematic diagram of the preferred embodiment of a system according to the invention.
Figure 2:
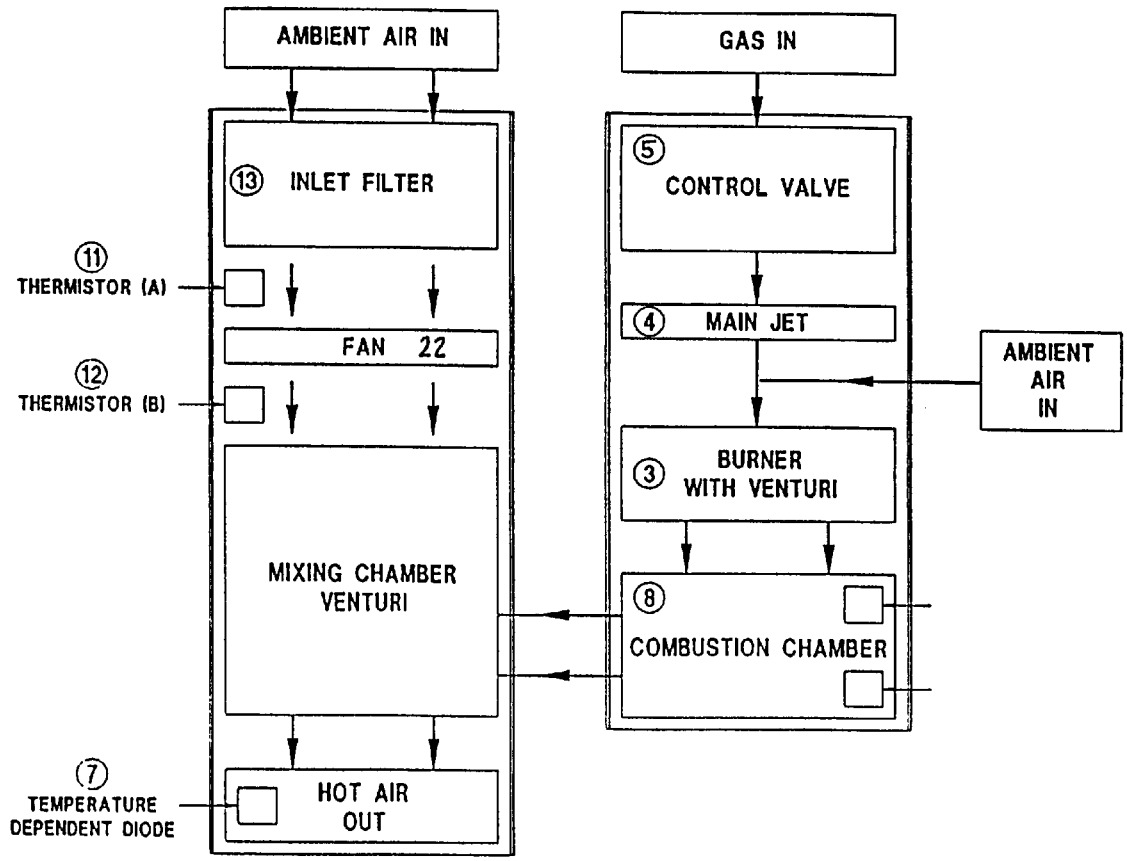
FIG. 2 is a schematic diagram of the airflow and sensing means of the invention of FIG. 1.
Figure 3:
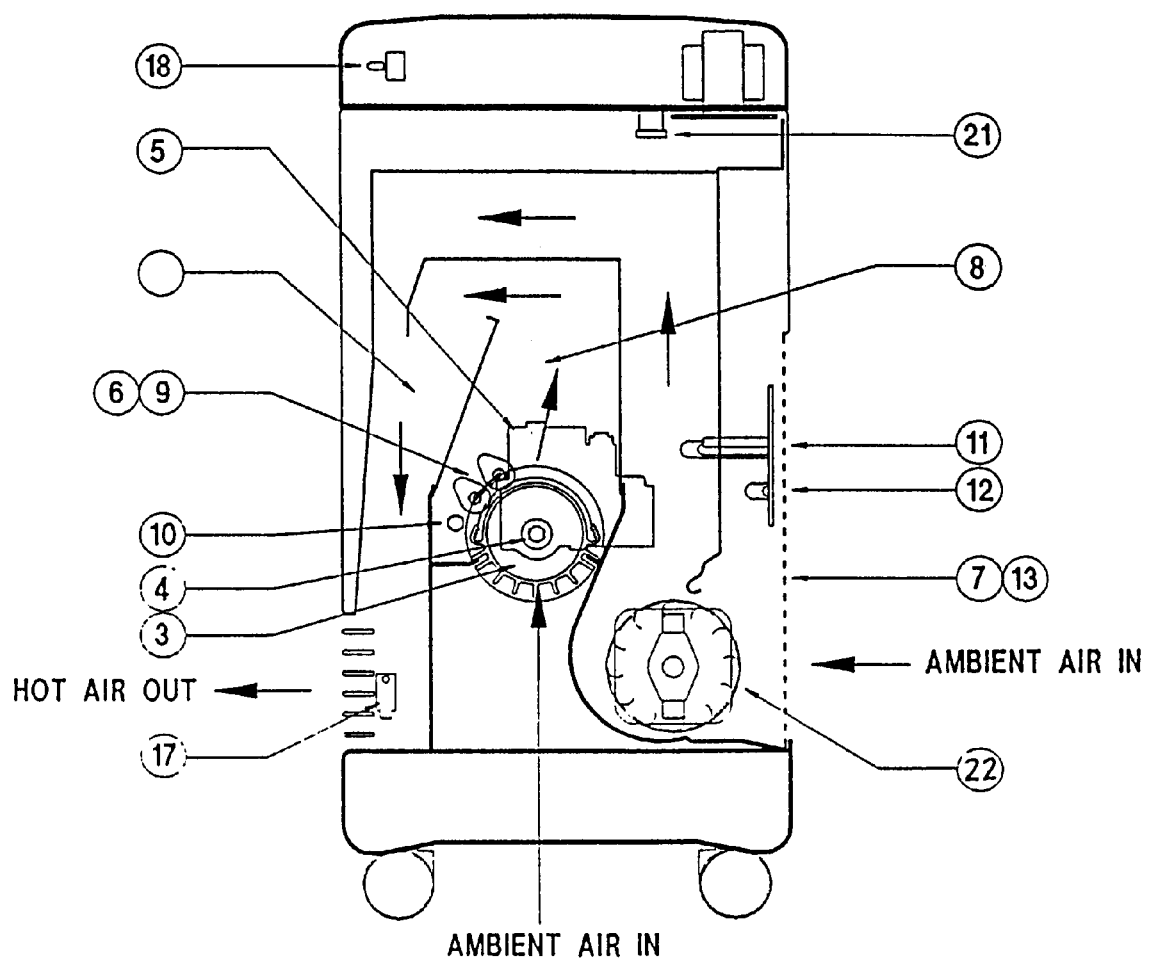
FIG. 3 is a sectional view of the invention of FIGS. 1 and 2.

Referring to the drawings, there is illustrated a system 1 for controlling a gas appliance in the form of a heater 2. The heater includes a gas burner 3, a main jet 4, a control valve 5, an ignition system 6, a cooling air intake 7 and a combustion chamber 8.

Preferably, the gas burner 3 is of the multi-layer mesh type. Alternatively, a single layer mesh may be used. It is also preferable that the main jet 4 injects into a venturi to increase the efficiency of gas burning. The ignition system 6 includes a pair of electrodes 9 disposed adjacent to burner 3 such that an arc passing between the electrodes ignites the fuel-air mixture coming from the burner. The preferred embodiment also includes a combustion chamber 8 which uses a venturi action in combination with cooling air flow to draw heated gases from the combustion chamber and distribute them into the surrounding room.

In the preferred embodiment, several sensing means are provided. A first sensing means is provided in the form of a thermocouple 10 mounted proximate to the gas burner 3.

First and second thermistors 11 and 12 are disposed within the air intake 7 downstream from an air filter 13.

A gas pressure sensor (not shown) is provided to measure the gas pressure being supplied to main jet 4. A variable solenoid (not shown) is used to alter or stop gas flow in response to detection of gas pressure faults, or for the purpose of regulating gas flow to improve combustion quality.

A first controller includes a microprocessor 14 linked to a non-volatile memory unit 15, which is capable of storing a number of past error conditions. Memory unit 15 also contains heater calibration parameters.

Interface means are provided in the form of a second controller 16 which includes a second microprocessor and memory unit (not shown). The controller 16 selectively accesses the contents of the memory unit 15.

In use, each of the sensing means generates a signal indicative of the status of a particular aspect of the appliance, each signal being provided to microprocessor 14. The microprocessor then processes the signals in conjunction with calibration parameters stored in the memory unit 15 in order to vary the status of the appliance as necessary.

In a preferred embodiment, microprocessor 14 obtains a signal (the "ODS" signal) from the thermocouple 10 and a temperature sensor 17 to monitor the level of $CO_2$, and conversely the level of $O_2$, ($CO_2/O_2$ concentration) in the incoming ambient air. The temperature sensor 17 may be, for example, a temperature sensitive diode. Microprocessor 14 causes the heater to shut down if the $CO_2$ concentration rises above a preselected level. The temperature sensor 17 placed in an air outlet provides a signal indicative of the temperature of the combustion material. Microprocessor 14 utilizes this signal to ensure that short term transients in the composition of the fuel/air mixture will not cause the system 1 to shut down the heater unnecessarily, but major changes are detected for comparison with valid status parameters.

The thermocouple 10 is placed a the edge of the screen mesh of the burner 3 where the air/fuel mixture is least stable and is heated by the flame in the combustion chamber. This location is important because changes in the $CO_2$ concentration then have an immediate effect on the thermocouple 10 temperature and the resulting voltage generated. Other spots around the edge of the burner 3 may produce voltage signal strength variations, but the effect is less where the air/fuel mixture is more stable.

It has been found that flame temperature also varies with acceptable variations in gas supply temperature and gas heating value. The resulting variations can be larger than variations due to $CO_2$ rise or oxygen depletion. Natural gas and propane are, for example, types of gas having different heating values.

Heat output also changes with gas pressure or heating value. As a result, so does the temperature of the heated air mixture flowing over the sensor 17. In the case of using a diode for the sensor 17, the resistive voltage drop in the diode is proportional to temperature. The diode is placed in series with the thermocouple 10 to provide the ODS signal. As temperature rises, so does the voltage generated by the thermocouple 10 and the voltage drop caused by the diode. The voltage sum across the thermocouple 10 and the diode changes only slightly with acceptable variations in supply pressure or heating value. As a result, normal fuel variations do not cause false indications of oxygen depletion (or excessive $CO_2$ rise).

Alternatively, the signals from the thermocouple 10 and the sensor 17 can be supplied to the microprocessor 14 independently for processing (e.g., the microprocessor can digitally sum the signals).

The heat released by combustion is not affected as oxygen or carbon dioxide levels change, a long as oxygen is in excess supply. The flame changes as does the temperature of the thermocouple, but the total heat released does no change. Thus, the diode voltage drop remains constant, but the thermocouple voltage falls as the $CO_2$ level rises.

Testing has shown, for example, that the voltage produced by the series combination of the thermocouple and diode drops approximately 3 to 4 millivolts when oxygen in the room air is reduced from the normal 20.9 percent to 18.1 percent (the minimum standard). This drop is called the ODS offset voltage and is stored as a calibration parameter in the memory unit 15.

Based on the normal operating voltage or ODS reference voltage (also stored as a calibration parameter in the memory unit 15), an ODS trip voltage is defined as the difference between the reference voltage and the offset voltage. If the ODS signal drops below the trip voltage, the heater is shut down and provides an audio and visual alarm. This fault condition is also recorded in the memory unit 15.

Figure 4:
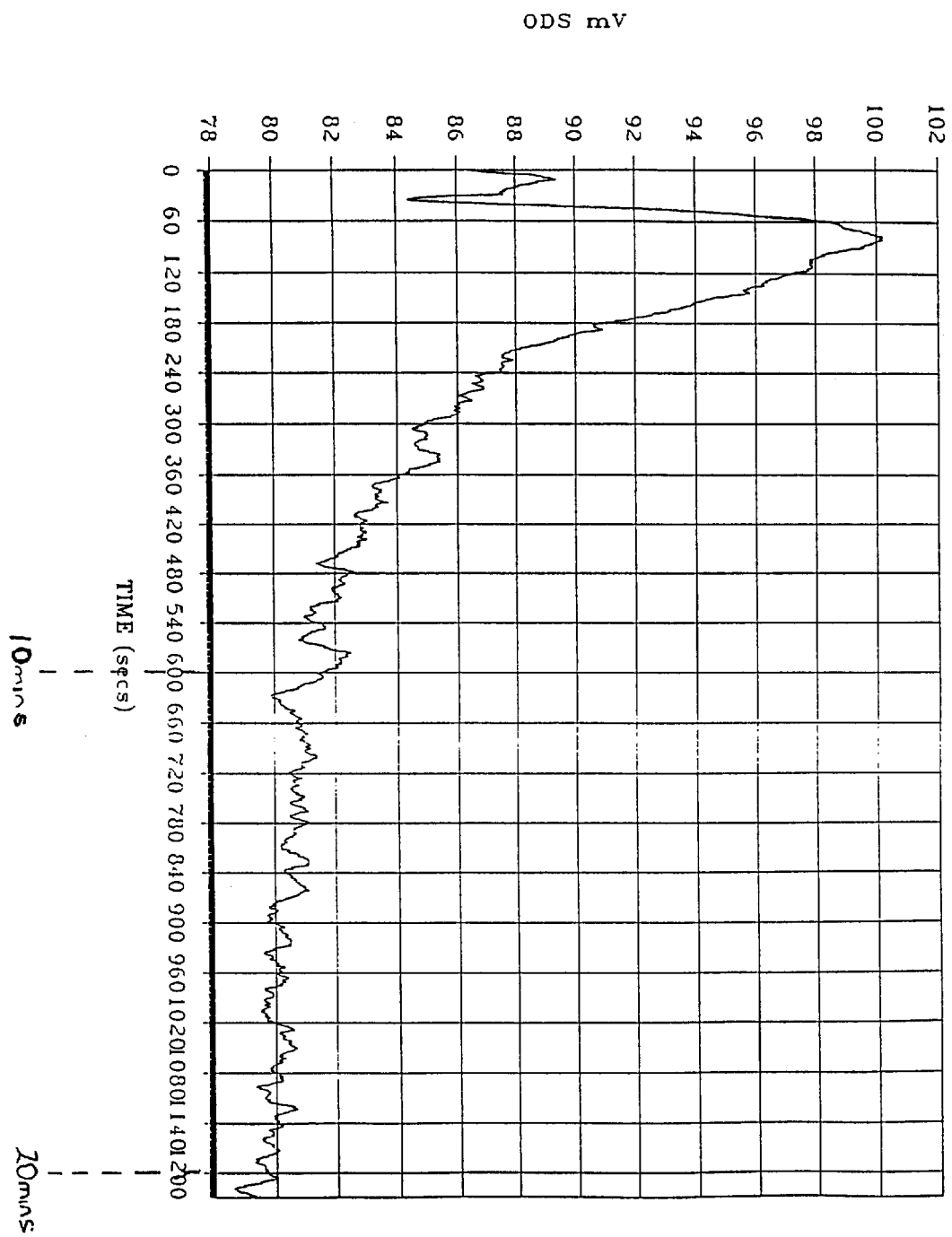
FIG. 4 shows a graph of raw ODS data.
Figure 5:
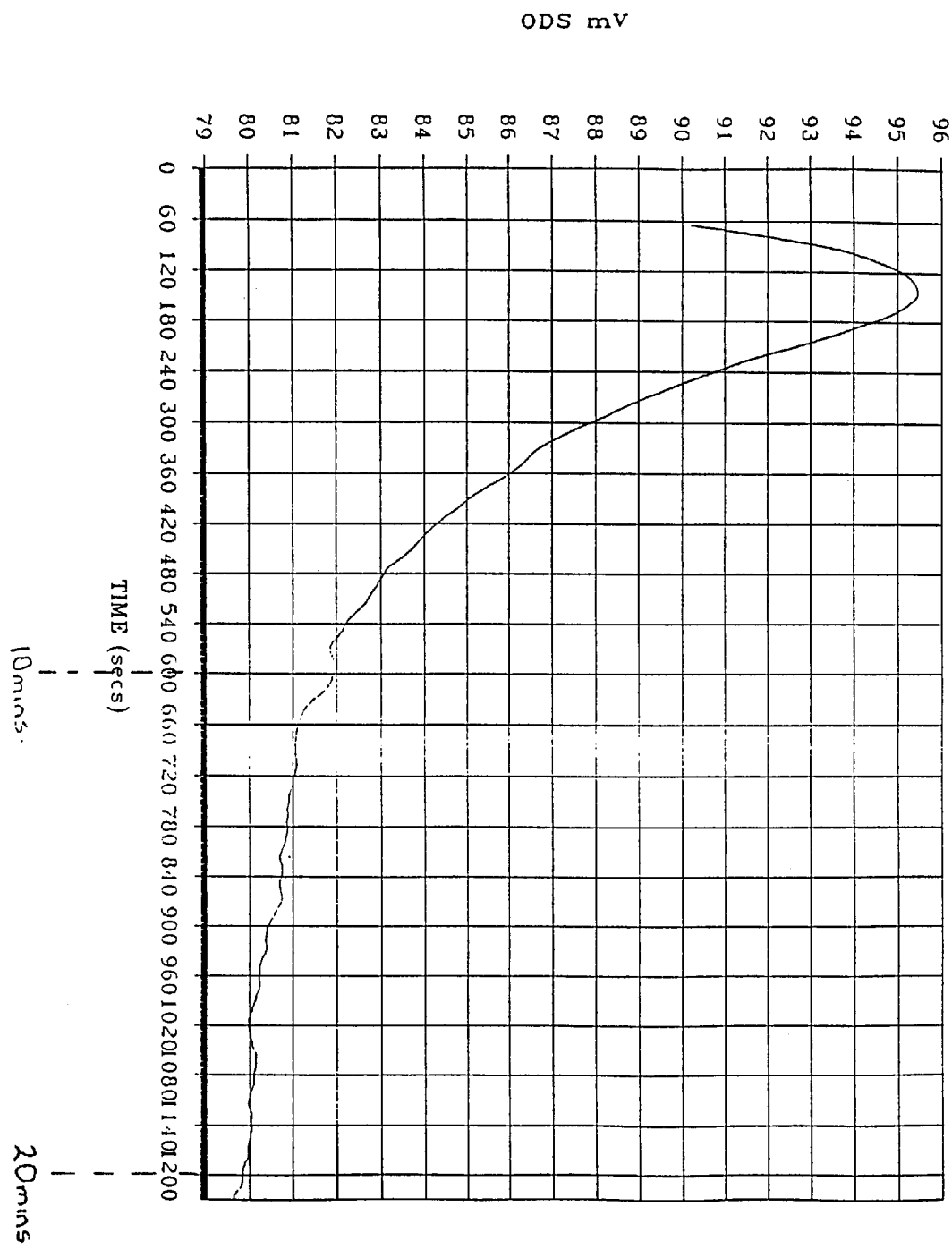
FIG. 5 shows a graph of the data of FIG. 4 after a smoothing filter has been applied.
Figure 6:
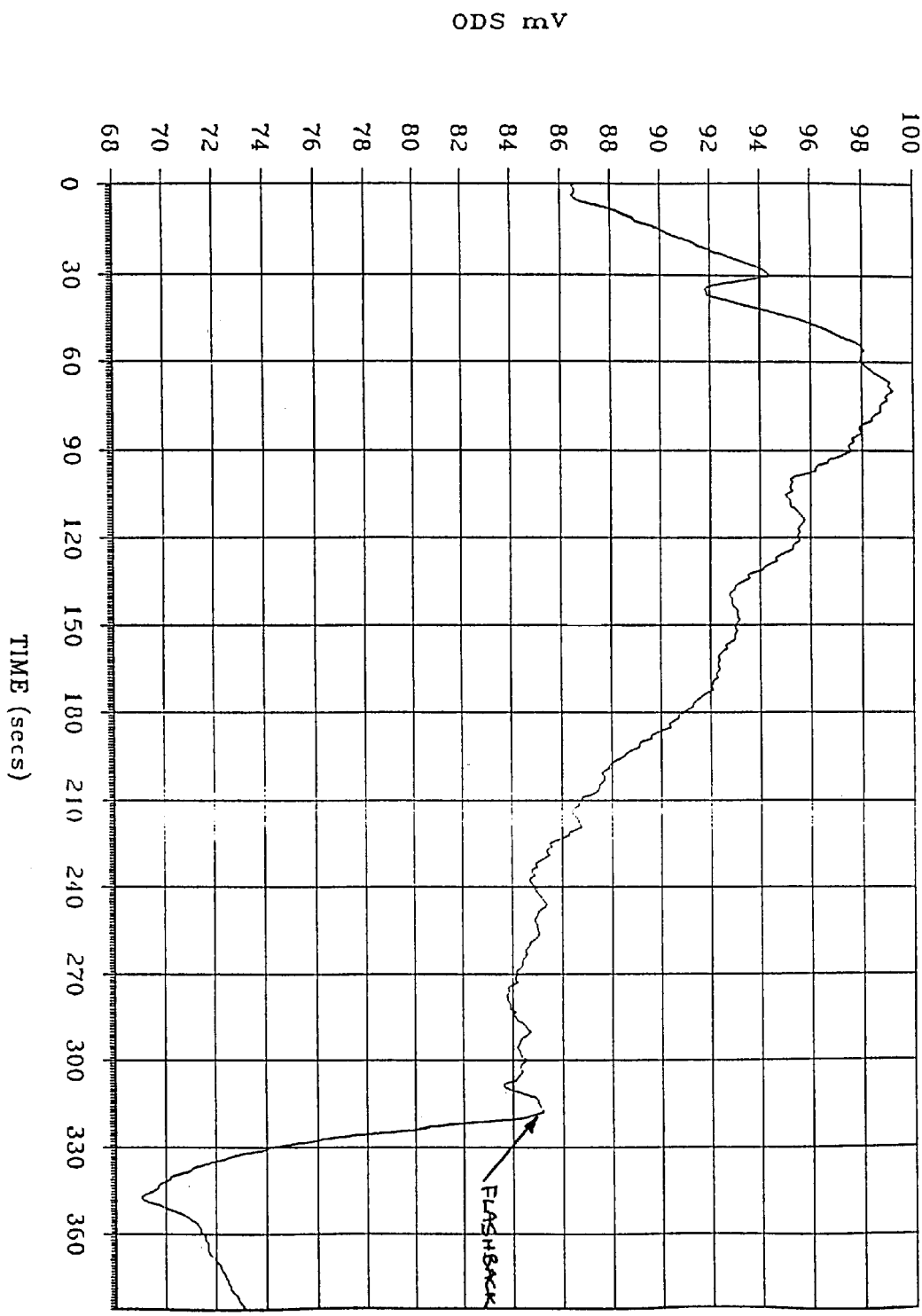
FIG. 6 shows a graph of the ODS signal in response to a flashback condition.
Figure 7:
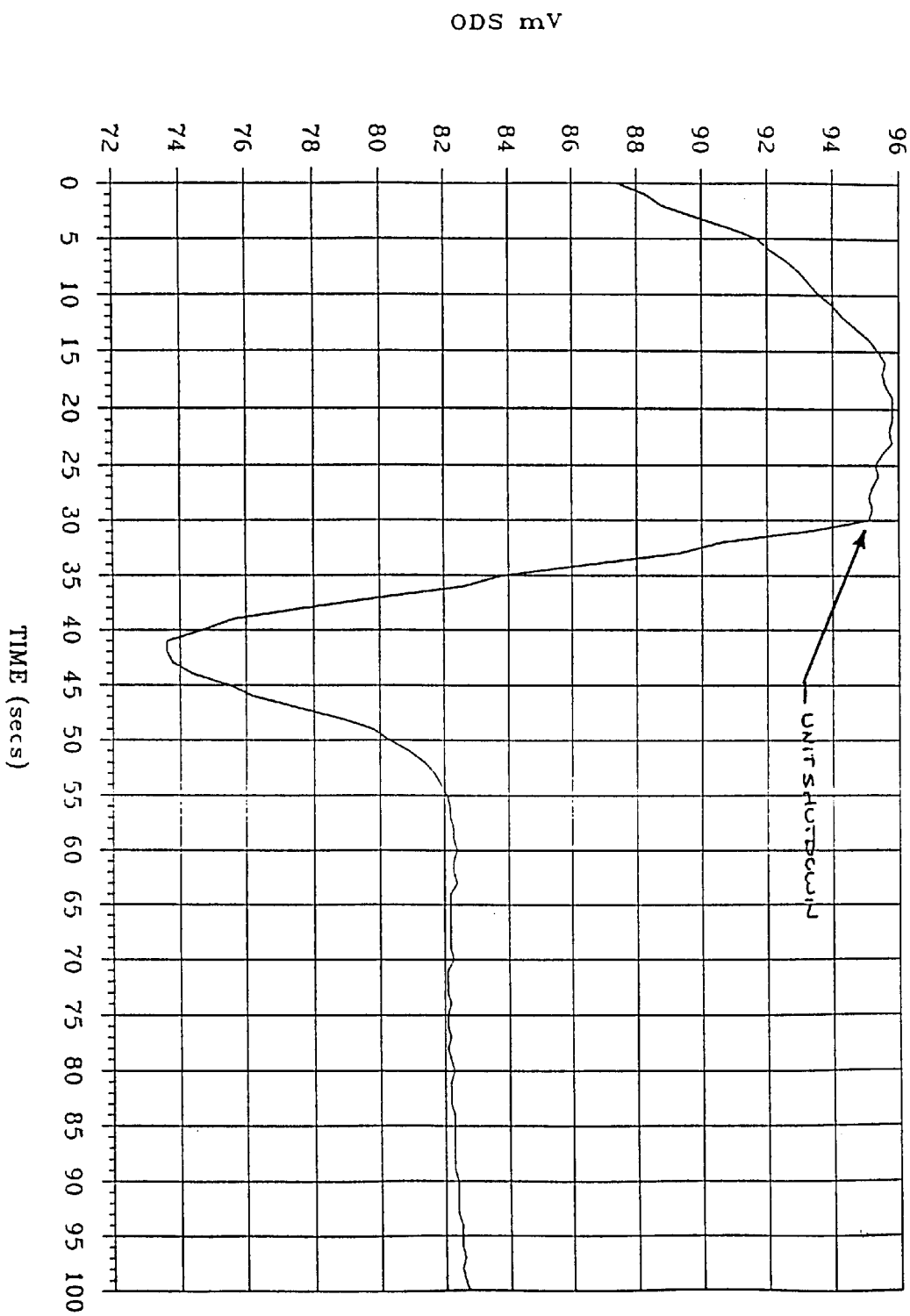
FIG. 7 shows a graph of the ODS signal when a natural gas heater is run on LP gas.
Figure 8:
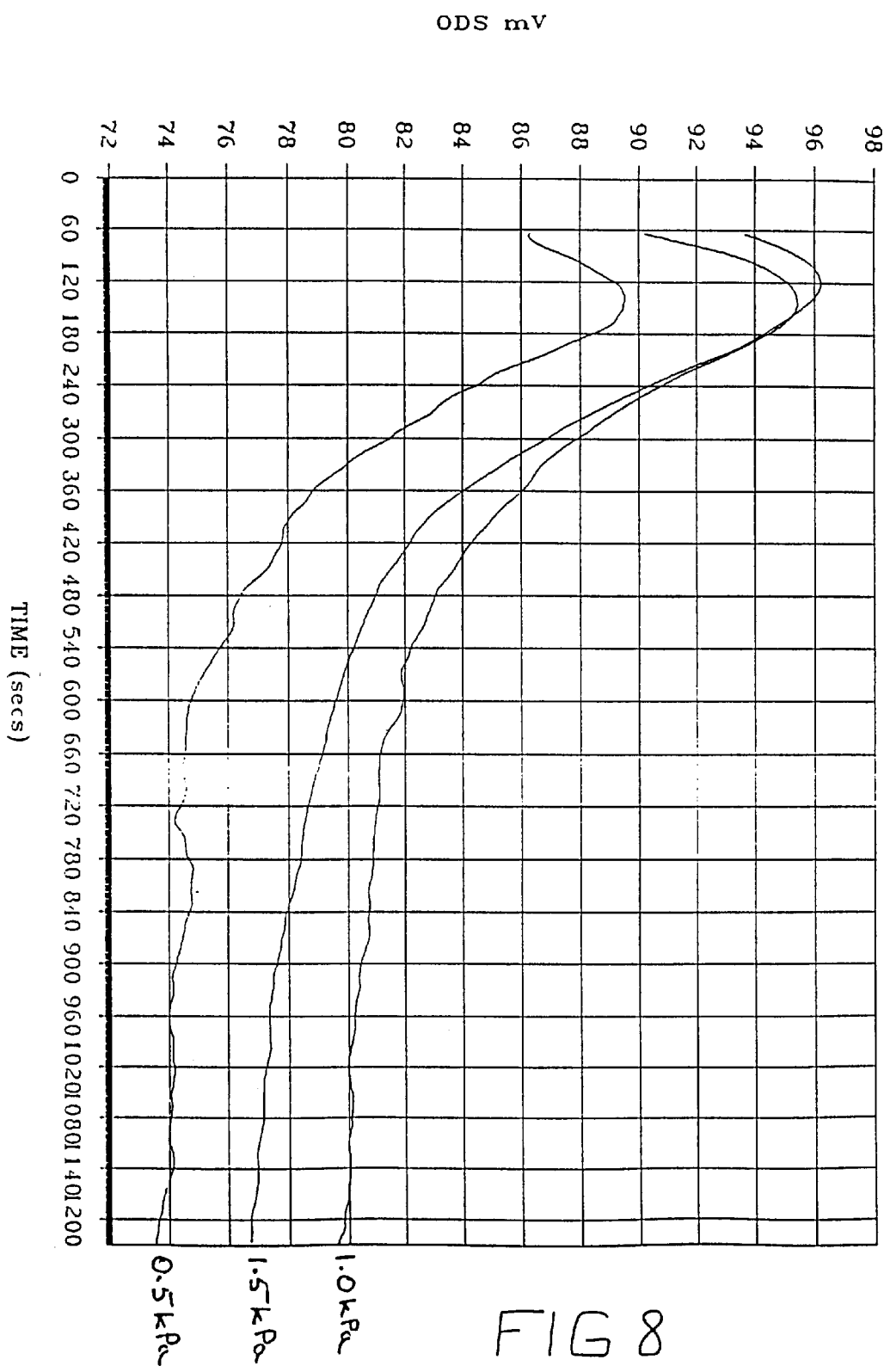
FIG. 8 shows a comparative graph of the averaged ODS signal for three different gas pressures of 0.5, 1.0 and 1.5 kPa.
Figure 9:
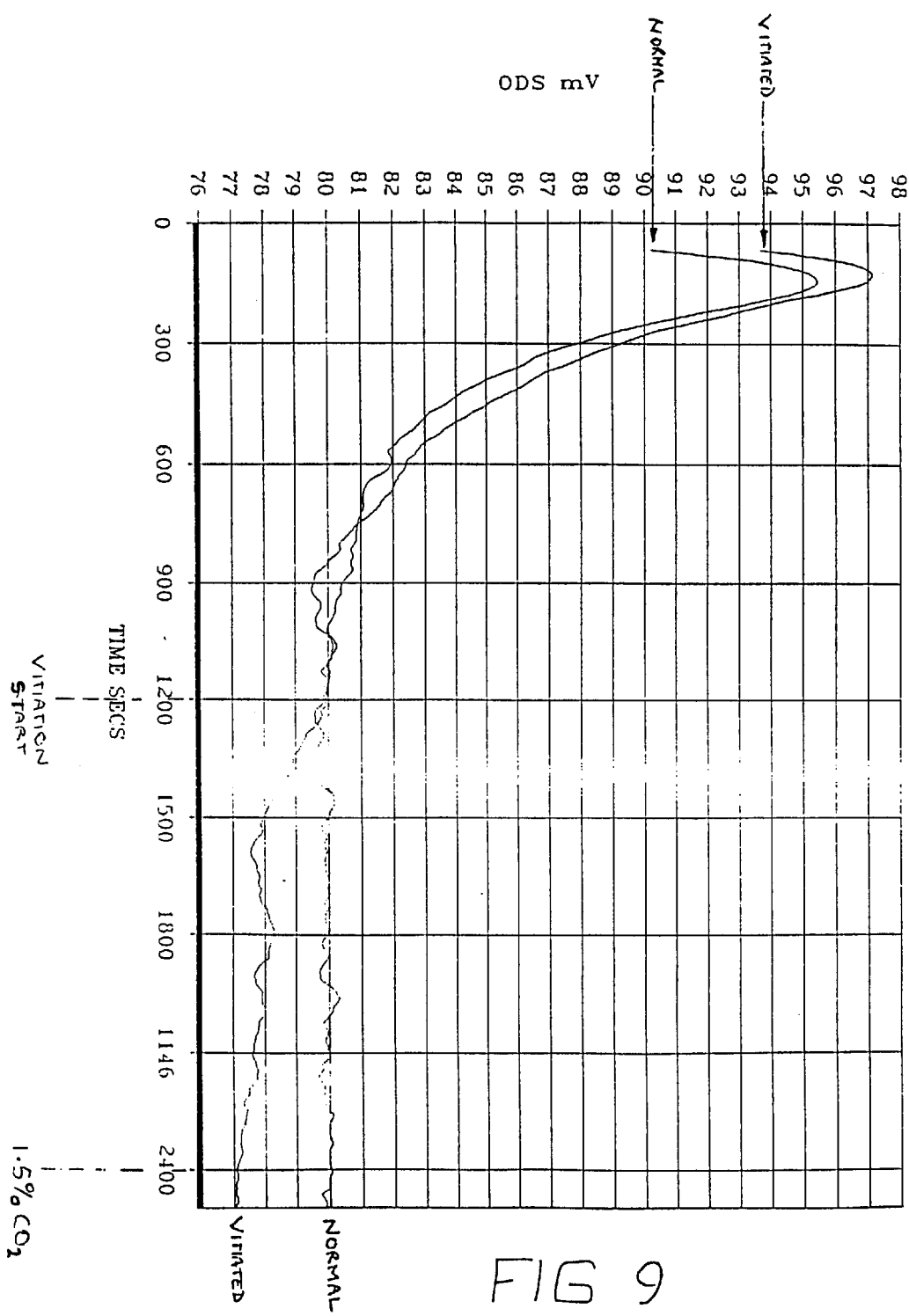
FIG. 9 shows a comparative graph of the average ODS signals for a heater running in both vitiated and ventilated rooms.

In the preferred embodiment, ODS signal is filtered by taking a moving average of the last 64 ODS values measured at 1 second intervals. These values are stored in a buffer (not shown). This has the effect of further smoothing spurious transients in the ODS signal, as shown in FIGS. 4 and 5.

A preferred embodiment of system 1 applied to heater 2 only stores oxygen depletion parameters for when the heater is set to its "high" heating range or mode. To measure oxygen depletion when heater 2 is set at other ranges, microprocessor 14 periodically switches the heater to "high" range (without changing the fan speed) for 60 seconds. The system is allowed to stabilize for the first 30 seconds, then $CO_2$ levels are measured for the following 30 seconds. Of course, ranges other than "high" range may be chosen as standard, and the time period may be correspondingly altered to provide stable and repeatable results.

The ODS check does not occur during the transient period when the heater 2 is first turned on. The flame initially radiates much of its energy to the cold walls of the combustion chamber 8, and its temperature is low. In this embodiment, the ODS signal may typically start at about 90 millivolts. The flame temperature rises as the walls heat up, and the ODS signal rises to about 95 millivolts.

The cold junction of the thermocouple 10 is located away from the combustion chamber 8. The cold junction temperature starts out cold, but slowly rises as heat soaks into the rest of the heater until steady state operation is reached. The rising cold junction temperature lowers the ODS signal to about 80 millivolts after about 10 minutes. Equilibrium is generally reached by about 10 minutes.

Each individual heater has a slightly different equilibrium voltage (i.e., ODS reference voltage). The value of the ODS voltage after 10 minutes during the first factory calibration of the heater is stored in the memory unit 15 as the ODS reference voltage.

Recalibration of the reference voltage is only permitted at sites approved by the manufacturer.

Microprocessor 14 may also process the ODS signal to check for other potentially dangerous situations, such as higher or lower heating value gases being supplied to the burner than the heater is designed for, or for gas pressures above or below preset allowable operating ranges. It can do this by also checking the ODS signal against an ODS maximum out-of-range value stored in the memory unit 15, for example, 100 millivolts and shutting down the heater if the maximum value is exceeded.

Similarly, an ODS minimum out-of-range value can be stored and used to control the heater.

Microprocessor 14 also controls ignition system 6 and selectively actuates a high intensity arc between electrodes 9 to ignite burner 3, as required.

The pair of electrodes also forms part of the sensing means. More particularly, an AC voltage is applied across electrodes 9. In the presence of a flame, that is, when burner 3 is ignited, flame rectification occurs, which allows a small rectified current in the order of up to, for example, four to five micro-amps to flow between the electrodes 9. This current is monitored by microprocessor 14. Should a predetermined current variation be detected (e.g., below 2 microamps), the system will be shut down. Accordingly, microprocessor 14 ensures that burner 3 remains alight and that the dangerous possibility of unburned gas leaking into the surrounding environment is avoided.

Microprocessor 14 also used to sense the presence of a flashback condition within the burner 3. This condition occurs when flame is no longer confined to the surface or just above the surface of the burner mesh, and in fact works its way back inside the burner. This is a dangerous condition and the ability to sense its presence is of extreme importance. In a preferred embodiment, flashback is detected by sensors operating in two different regimes.

During the first three minutes of heater operation while the thermocouple 10 is cold, if flashback occurs, the ionized gases providing flame rectification between the electrodes 9 stop and the microprocessor 14 shuts down the heater 2 and indicates an error condition.

After this initial period, the microprocessor 14 monitors the raw ODS signal (unfiltered) for sudden drops. Any drop is compared to a flashback voltage gradient (e.g., 5 millivolts in any 8 second period). If such a drop is detected, the microprocessor 14 shuts down the heater 2 and indicates a flashback condition. While the ODS signal formed by the combination of the thermocouple 10 and temperature sensor 17 may be used, superior flashback detection can be achieved with just the signal from the thermocouple 10.

In another embodiment, the current between the electrodes 9 is used to detect flashback at all times by the drop in the flame rectification current.

It has been determined that the flashback voltage gradient is distinctive to flashback, whether the heater is on low or high range. The flashback voltage gradient is also stored as a calibration parameter in the memory unit 15.

By sensing flashback, the burner 3 can be shut down upon flashback allowing it to be designed for optimum performance and cost rather than having to be designed to withstand the destructive effects of flashback.

Microprocessor 14 also processes signals from the first and second thermistors 11 and 12 to detect whether air intake 7 is blocked. The use of two thermistors enables microprocessor 14 to distinguish between a blocked filter condition and an air loss condition caused, for example, by failure of the fan 22. Should either one of the above conditions occur, microprocessor 14 stores an error message and/or takes action such as system shutdown, as appropriate.

The fan 22 draws cooling air from the filter 13 and from the controller compartment 23 (e.g., 8 percent). The air status signal is arranged so that it increases when the temperature of the filter thermistor 12 rises and decreases when the temperature of the downstream thermistor 11 rises. As the filter 13 becomes progressively more dirty, more air is drawn from the controller compartment 23, and this air is warmer than ambient air. The thermistor 12 is then heated and the air status signal increases toward an airflow upper out-of-range value that is stored as a calibration parameter in the memory unit 15. When the upper value is exceeded, a dirty filter indication is provided, but the heater continues to operate.

If the filter 13 becomes too blocked or the fan 22 stops, the thermistor 11 heats up from being proximate to the combustion chamber 8 and decreases the air status signal toward an airflow lower out-of-range value that is stored as a calibration parameter in the memory unit 15. When the lower value is exceeded, a fault indication is provided and the heater is shut down.

As an alternate embodiment, the thermistor 12 can be eliminated and a PTC resistor substituted for the thermistor 11.

The first controller may also sense failure of the fan 22 by sensing current drawn by the fan.

Microprocessor 14 may also monitor the speed of the fan 22. Changes in cooling airflow can significantly affect emissions of $NO_x$ and CO, so microprocessor 14 can regulate the speed of the fan to ensure constant, precise airflow. In one embodiment, the fan is driven by an AC motor and the microprocessor controls its speed by altering the frequency of the AC drive current. Alternatively, microprocessor 14 can alter the DC voltage applied to a DC motor as required.

Controller 16 selectively communicates with microprocessor 14 through a bi-directional infrared or radio frequency communication link 18. An operator may use controller 16 to interrogate memory unit 15. Required information is obtained via microprocessor 14 to ascertain past errors and historical data which have occurred and to read the currently stored calibration parameters. Moreover, controller 16 allows an operator to vary the calibration parameters, or alter contents of memory unit 15. An operator can also read data about the particular heater, such as its serial number, date of manufacture, the number of operational hours (helpful to determine warranty life) and so on. Also, the operator can monitor in real time the operating heater voltages.

It is preferred that a third controller 19 interfaces with heater 2 by infrared or radio frequency communication. Third controller 19 can set timing functions, telling the heater when to turn on or off. It may also set a desired room temperature, or alter any of the parameters in the memory unit such as the current heat mode. In a preferred embodiment, the third controller's functions are limited to prevent a user from interfering with heater parameters or calibrations.

System errors that are recognized by microprocessor 14 are stored in the memory unit 15. These stored errors may be communicated to the user in a number of ways. A graphical display may be used which gives a text message about particular errors. Alternatively, a recorded voice message may give similar information. Other information may include directions to enable the user to fix the problem, a telephone number to call for service, a description of the problem or a specific code related to the particular error, or data on the total number of hours over which the heater has been used.

In the preferred embodiment, five light emitting diodes (LEDs) of different colors display information by using a code which allows for each LED to be either on, off or blinking. Each code of a combination of on, off or blinking colored LEDs corresponds to a particular error message, allowing a user who is unable to repair the unit to call a service center. The service center, by interrogating the user about the code displayed, may dispatch a service person equipped to deal with the precise fault described or advise the user of simple corrective actions.

Other sensors may be included for the purpose of safety and efficiency. For example, in the preferred embodiment there is provided a tilt sensor 20 which causes the first controller to shut down the heater 2 if the heater is tipped over. A further example is an overheat sensor 21.

The first controller checks for corruption and other errors in the data stored in the memory unit 15. These data parameters are optimized for a particular heater, but if they are corrupted, more conservative, non-optimized data are substituted. The non-optimized data are stored in unalterable memory and are substituted for the corrupted data by the microprocessor 14.

This limp-home mode can be initiated either in response to an operator input to an error indication or an automatic response.

The first controller checks for a flame signal before ignition and flame after gas shut off (e.g., a foreign object can block the valve from closing). If flame signal is found, an alert is provided and a fault condition stored. In addition, the fan 22 is activated for the period of the fault.

In one preferred embodiment, the first controller monitors the temperature in the controller compartment 23 and shuts down the heater if a maximum controller temperature is exceeded. The maximum controller temperature may be stored as a calibration parameter in memory unit 15.

The first controller also regulates gas and air flow to the combustion chamber to optimize control of the emission of oxides of nitrogen and carbon monoxide.

Finally, the first controller may also use "fuzzy logic" processing.

Although the invention has been described with reference to specific examples, it will be appreciated by those skilled in the art that the invention may be embodied in many forms.

What is claimed:

1. A heating appliance fueled by a combustible gas comprising:
    a gas burner, said gas burner providing a combustion site for substantially all of the combustion;
    a jet for delivering the gas to said burner;
    a valve for controlling flow of the gas to said jet;
    an electrical ignition system for selectively igniting gas at the burner;
    a combustion chamber about said burner, said chamber having an inlet for combustion air and an outlet for burned gases;
    a combustion status sensor located at said combustion site for providing a signal indicative of a combustion status to be sensed; and
    a first controller that controls said appliance in accordance with said combustion status signal and a plurality of stored calibration parameters, said controller thereby being responsive to at least one of $CO_2/O_2$ concentration, flashback, combustible gas type, or gas pressure.

2. A heating appliance according to claim 1, further comprising a second controller in two-way communication with said first controller for receiving operational status and historical data from said first controller and for providing control signals to said first controller to change said stored calibration parameters.

3. A heating appliance according to claim 1, further comprising a third controller in one-way communication with said first controller for providing control signals to said first controller to control at least one of ambient temperature to be maintained, time of day to operate, or heat mode.

4. A heating appliance according to claim 1, wherein said sensor is a combustion temperature sensor.

5. A heating appliance according to claim 4, wherein said stored calibration parameters are at least one of ODS offset voltage, ODS reference voltage, ODS trip voltage, ODS maximum out-of-range voltage, ODS minimum out-of-range voltage, flashback voltage gradient, airflow upper out-of-range value, airflow lower out of range value, or maximum first controller temperature.

6. A heating appliance according to claim 1, wherein said sensor is a combustion gas conductivity sensor.

7. A heating appliance according to claim 6, wherein said ignition system includes electrodes for providing an electrical arc and said combustion gas conductivity sensor shares said electrodes.

8. A heating appliance according to claim 6, wherein said stored calibration parameters are at least one of ODS offset voltage, ODS reference voltage, ODS trip voltage, ODS maximum out-of-range voltage, ODS minimum out-of-range voltage, flashback voltage gradient, airflow upper out-of-range value, airflow lower out of range value, or maximum first controller temperature.

9. A heating appliance according to claim 1, wherein said first controller is adapted to store a plurality of past error conditions and provide said conditions to an operator.

10. A heating appliance according to claim 1, wherein said combustion status signal is filtered to remove short term transients.

11. A heating appliance according to claim 1, further comprising:
    an intake for cooling air;
    an outlet for said cooling air and said burned gases;
    a cooling air fan communicating between said cooling air intake and said outlet for said cooling air and said burned gases;
    a first temperature sensor between said cooling air intake and said fan;
    a second temperature sensor between said fan and said outlet for said cooling air and said burned gases;
    said first controller being responsive to said first and second sensors to detect a blockage of said cooling air intake or a failure of said cooling air fan.

12. A heating appliance according to claim 1, further comprising:
    an intake for cooling air;
    an outlet for said cooling air and said burned gases;
    a cooling air fan communicating between said cooling air intake and said outlet for said cooling air and said burned gases;
    a temperature sensor between said fan and said outlet for said cooling air and said burned gases;

said first controller being responsive to said sensor to detect a blockage of said cooling air intake or a failure of said cooling air fan.

13. A heating appliance fueled by a combustible gas comprising:

a gas burner, said gas burner providing a combustion site for substantially all of the combustion;

a jet for delivering the gas to said burner;

a valve for controlling flow of the gas to said jet;

an electrical ignition system for selectively igniting gas at the burner;

a combustion chamber about said burner, said chamber having an inlet for combustion air and an outlet for burned gases;

a thermocouple located at said combustion site for providing a first signal indicative of a combustion status to be sensed;

an intake for cooling air;

an outlet for a combination of said cooling air and said burned gases;

a temperature sensor located near said outlet for said combined cooling air and burned gases, said temperature sensor providing a second signal indicative of the combustion status to be sensed; and a first controller that controls said appliance in accordance with said combustion status signals, wherein said combustion status is at least one of $CO_2/O_2$ concentration, flashback, combustible gas type, or gas pressure.

14. A heating appliance according to claim 13, wherein said temperature sensor is a diode.

15. A heating appliance according to claim 13, wherein first and second combustion status signals are added.

16. A heating appliance fueled by a combustible gas comprising:

a gas burner, said gas burner providing a combustion site for substantially all of the combustion;

a jet for delivering the gas to said burner;

a valve for controlling flow of the gas to said jet;

an electrical ignition system for selectively igniting gas at the burner;

a combustion chamber about said burner, said chamber having an inlet for combustion air and an outlet for burned gases;

a combustion gas temperature sensor located at said combustion site for providing a first signal indicative of a combustion status to be sensed;

a combustion gas conductivity sensor located at said combustion site for providing a second signal indicative of a combustion status to be sensed; and a first controller that for an initial period controls said appliance in accordance with said second signal and for a later period controls said appliance in accordance with said first signal, said controller thereby being responsive to flashback during either period.

17. A heating appliance according to claim 16, wherein said ignition system includes electrodes for providing an electrical arc and said combustion gas conductivity sensor shares said electrodes.

18. A heating appliance fueled by a combustible gas comprising:

a gas burner, said gas burner providing a combustion site for substantially all of the combustion;

a jet for delivering the gas to said burner;

a valve for controlling flow of the gas to said jet;

an electrical ignition system for selectively igniting gas at the burner;

a combustion chamber about said burner, said chamber having an inlet for combustion air and an outlet for burned gases;

a fan for providing combustion air;

a combustion sensor located at said combustion site; and a first controller that provides an alert sequence if said sensor detects an ongoing combustion signal before an ignition attempt or if combustion continues after gas shutoff, said alert sequence including activating said fan for the duration of said alert sequence.

19. A heating appliance according to claim 1, 13, or 18, wherein said first controller checks for errors in a plurality of alterable optimized stored data and upon detection of an error provides an alert and substitutes unalterable non-optimized data for the optimized data.

20. A heating appliance according to claim 19, wherein said substitution is in response to an operator input.

21. A heating appliance according to claim 19, wherein said substitution is automatically performed by said first controller.

22. A heating appliance according to claim 11, 12, or 18, wherein said first controller varies the speed to said fan to control at least one of $NO_x$ and CO.

23. A heating appliance according to claim 11, 12, or 18, wherein said first controller controls the valve and the fan to control at least one of $NO_x$ and CO.

24. A heating appliance according to claim 18, wherein said first controller senses fan failure by sensing fan current.

* * * * *